US009824820B2

(12) United States Patent
Grote et al.

(10) Patent No.: US 9,824,820 B2
(45) Date of Patent: Nov. 21, 2017

(54) LAYERED CAPACITOR DEVICE WITH CHARGE BLOCKING LAYERS

(71) Applicants: James Gerard Grote, Yellow Springs, OH (US); Donna Marie Joyce, Beavercreek, OH (US); Fahima Ouchen, Beavercreek, OH (US)

(72) Inventors: James Gerard Grote, Yellow Springs, OH (US); Donna Marie Joyce, Beavercreek, OH (US); Fahima Ouchen, Beavercreek, OH (US)

( * ) Notice: Subject to any disclaimer, the term of this patent is extended or adjusted under 35 U.S.C. 154(b) by 211 days.

(21) Appl. No.: 14/754,914

(22) Filed: Jun. 30, 2015

(65) Prior Publication Data

US 2015/0380163 A1 Dec. 31, 2015

Related U.S. Application Data

(60) Provisional application No. 62/018,720, filed on Jun. 30, 2014.

(51) Int. Cl.
| | |
|---|---|
| *H01G 4/14* | (2006.01) |
| *H01G 4/18* | (2006.01) |
| *H01G 4/30* | (2006.01) |
| *H01G 4/008* | (2006.01) |
| *H01G 4/012* | (2006.01) |
| *H01G 4/232* | (2006.01) |

(52) U.S. Cl.
CPC ........... *H01G 4/186* (2013.01); *H01G 4/0085* (2013.01); *H01G 4/012* (2013.01); *H01G 4/30* (2013.01); *H01G 4/232* (2013.01)

(58) Field of Classification Search
CPC ........................................................ H01G 4/14
See application file for complete search history.

(56) References Cited

U.S. PATENT DOCUMENTS

2011/0110015 A1* 5/2011 Zhang ..................... H01G 4/20
361/311

OTHER PUBLICATIONS

Faber et al., "First-principles GW calculations for DNA and RNA nucleobases", Physical Review, B83, 115123, Jan. 19, 2011.
Foster et al., "Nonempirically Tuned Range-Separated DFT Accurately Predicts Both Fundamental and Excitation Gaps in DNA and RNA Nucleobases", J. Chemical and Computation, 8, pp. 2682-2287, 2012.
Hong et al., "Effect of BCP ultrathin layer on the performance of organic light-emitting devices", Optoelectronics Letters, vol. 4, No. 5, Sep. 1, 2008.

(Continued)

*Primary Examiner* — Eric Thomas
(74) *Attorney, Agent, or Firm* — Dinsmore & Shohl LLP (57) ABSTRACT

A multi-layered capacitor device is provided in which the multi-layered capacitor device includes a metal or metal-oxide ground electrode, a capacitor dielectric layer, a metal or metal-oxide top electrode, a hole blocking layer and an electron blocking layer. The hole blocking layer is located at the interface of the metal or metal-oxide ground electrode and the capacitor dielectric layer to increases the effective barrier height at the interface. The electron blocking layer is located at the interface of the metal or metal-oxide top electrode and the capacitor dielectric layer to increases the effective barrier height at the interface.

19 Claims, 8 Drawing Sheets

(56) References Cited

OTHER PUBLICATIONS

Ho et al., "Effect of Alteration of Antioxidant by UV Treatment on the Dielectric Strength of BOPP Capacitor Film", IEEE Trans. Dielectr. Electr. Insul., vol. 14, No. 5, pp. 1295-1301, Oct. 2007.
Chen et al., "High field tunneling as a limiting factor of maximum energy density in dielectric energy storage capacitors", Applied Physics Letters, 92, 142909, 2008.
Mackey et al., "Reduction of Dielectric Hysteresis in Multilayered Films via Nanoconfinement", ACS Publications, Macromolecules, 45, pp. 1954-1962, 2012.
Ouchen et al., "Investigation of DNA nucleobases—thin films for potential applications in electronics and photonics", SPIE Proceedings, 8817(20), 2013.
Zhu et al., "Novel Ferroelectric Polymers for High Energy Density and Loss Loss Dielectrics", ACS Publications, Macromolecules, 45, pp. 2937-2954, 2012.

\* cited by examiner

LAYERED CAPACITOR DEVICE WITH CHARGE BLOCKING LAYERS

CROSS-REFERENCE TO RELATED APPLICATIONS

This application claims the benefit of priority under 35 U.S.C. §119(e) to U.S. Provisional Application Ser. No. 62/018,720, filed Jun. 30, 2014, incorporated herein by reference in its entirety.

STATEMENT REGARDING FEDERALLY SPONSORED RESEARCH OR DEVELOPMENT

This invention was made with government support under Contract No. FA8650-11-D-5401-000112 awarded by the Air Force. The government has certain rights in the invention.

TECHNICAL FIELD

Embodiments of the invention relate to a layered capacitor device, and more particularly, to a capacitor device including a hole-blocking layer and an electron blocking layer which function as barrier layers to increase the dielectric strength of the capacitor.

BACKGROUND

High energy density capacitors are known for use in mobile devices and various power systems. Polymer film capacitors utilizing biaxially oriented polypropylene (BOPP) have been used for the past few decades because of their exceptionally high electric field strength of between 600-700 V/μm. See J. Ho, R. Ramprasad, and S. Boggs, *IEEE Trans. Dielectr. Eletr. Insul.* (2007), 14 1295-1301. Such a polymer capacitor is limited by its low dielectric constant k=2.2 (1 kHz) and operating temperature (−55 to 65° C.). Ceramic dielectrics have been used as an alternative to polymer dielectrics as they have a high dielectric constant (k), but they have lower electric field strength. Research into high energy density materials has revealed that materials having a high dielectric constant and high electric field strength, which are main aspects of increasing potential energy density, have increasing limitations at high fields. Energy density is directly proportional to the square of the electric field breakdown. Among the factors that lead to catastrophic breakdown in dielectric-based capacitors are the tunneling currents. The accumulation of charge carriers at the metal/dielectric interface lowers the energy barriers, which causes the charges to tunnel through the dielectric, leading to breakdown. This, in turn, reduces the charging and discharging efficiency of the capacitor. In addition, non-uniformities and/or defects in the metal electrodes applied directly to the capacitor dielectric can potentially produce high energy fields around the non-uniformity or defect, reducing the electric field breakdown.

Studies have shown that at very high electric fields, the leakage current sharply increases with field due to tunneling, resulting in reduced efficiency of the device. See Chen et al., "High Field tunneling as a limiting factor of maximum energy density in dielectric energy storage capacitors," *Applied Physics Letters* 92, 142909, 2008. Increasing the maximum field may not increase the energy density of the device. High fields may also induce large hysteresis loops as investigated by Zhu et al., "Novel Ferroelectric Polymers for High Energy Density and Low Loss Dielectrics," *Macromolecules* (2012), 45, 2937-2954, which showed that the efficiency of devices drops off at high fields. Thus, while high energy density capacitor materials can be influenced by increasing dielectric constant and dielectric strength, performance limitations exist at high fields.

It would be desirable to increase the electric field strength of a polymer dielectric to achieve low volume and low weight to meet the current and future needs for high energy density embedded capacitors. Accordingly, there is a need for an improved high energy density capacitor for use in a number of applications having increased dielectric strength which is not subject to tunneling.

SUMMARY OF THE INVENTION

Embodiments of the invention provide a high energy density embedded capacitor device having a layered structure which includes a hole blocking layer and an electron blocking layer which function as barrier layers between the metal contacts and the dielectric film in the capacitor. The device having a layered structure exhibits high dielectric constant, high temperature stability, and has delayed tunneling effects.

According to one embodiment, a multi-layered capacitor device is provided. The multi-layered capacitor device includes a metal or metal-oxide ground electrode, a capacitor dielectric layer, a metal or metal-oxide top electrode, a hole blocking layer, and an electron blocking layer. The hole blocking layer is disposed at the interface of the metal or metal-oxide ground electrode and the capacitor dielectric layer and the electron blocking layer disposed at the interface of the metal or metal-oxide top electrode and the capacitor dielectric layer.

In a further embodiment, a multi-layered capacitor device is provided. The multi-layered capacitor device includes a metal or metal-oxide ground electrode, a polymer-based capacitor dielectric layer, a metal or metal-oxide top electrode, a polymer-based hole blocking layer, and a polymer-based electron blocking layer. The ground electrode includes indium tin oxide coated glass, the capacitor dielectric layer includes deoxyribonucleic acid-hexadecyltrimethyl ammonium chloride and sol-gel, the metal or metal-oxide top electrode includes aluminum, the hole blocking layer includes bathocuproine and the electron blocking layer includes guanine. The polymer-based hole blocking layer is disposed at the interface of the metal or metal-oxide ground electrode and the polymer-based capacitor dielectric layer. Further, the hole blocking layer is less than 100 nm in thickness and the highest occupied molecular orbital level of the hole blocking layer is higher than the highest occupied molecular orbital level of the capacitor dielectric layer. The polymer-based electron blocking layer is disposed at the interface of the metal or metal-oxide top electrode and the polymer-based capacitor dielectric layer. Further, the electron blocking layer is less than 100 nm in thickness and the lowest unoccupied molecular orbital level of the electron blocking layer is lower than the lowest unoccupied molecular orbital level of the capacitor dielectric layer.

Accordingly, it is a feature of embodiments of the invention to provide a layered capacitor device with charge blocking layers exhibiting increased energy density. Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to embodiments of the multi-layered capacitor device of the present disclosure. Though the schematic of FIG. 1 is provided as exemplary, it should be understood that the present multi-layer capacitor devices may encompass other configurations.

A generic capacitor consists of two conductors separated by a non-conductive region called the dielectric. The conductors hold equal and opposite charges on their facing surfaces and the dielectric develops an electric field. Above a particular electric field, known as the dielectric strength, the dielectric in a capacitor becomes conductive. The voltage at which this occurs is called the breakdown voltage of the device, and is given by the product of the dielectric strength and the separation between the conductors. The maximum energy that can be stored safely in a capacitor is limited by the breakdown voltage. Thus, as energy density is directly proportional to the square of the electric field breakdown voltage, the energy density of a capacitor may be increased by increasing the electric field breakdown voltage.

Figure 1:
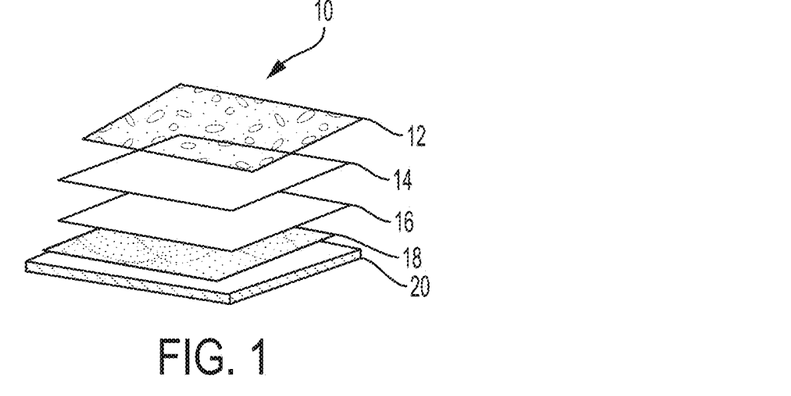
FIG. 1 is a schematic illustration of a multilayer capacitor device in accordance with an embodiment of the invention.

Referring now to FIG. 1, a multi-layered capacitor device 10 is illustrated in exploded form. The multi-layered capacitor device 10 includes a top electrode 12, an electron blocking layer 14 as a barrier layer, a capacitor dielectric film layer 16, a hole blocking layer 18 as a barrier layer, and a ground electrode 20.

The multi-layered capacitor device 10 has the metal or metal-oxide ground electrode 20, the capacitor dielectric layer 16, the metal or metal-oxide top electrode 12, the hole blocking layer 18, and the electron blocking layer 14. The hole blocking layer 18 is located at the interface of the metal or metal-oxide ground electrode 20 and the capacitor dielectric layer 16. Similarly, electron blocking layer 14 is located at the interface of the metal or metal-oxide top electrode 12 and the capacitor dielectric layer 16.

Embodiments of the capacitor device 10 described herein provide a number of advantages over prior devices in that the hole blocking layer 18 and electron blocking layer 14 function as barrier layers. The hole blocking layer 18 and electron blocking layer 14 are placed at the interfaces between the top electrode 12, ground electrode 20, and the capacitor dielectric layer 16. The inventors have found that the presence of these barrier layers provides a significant increase in the dielectric strength of the capacitor device 10 without affecting the dielectric constant of the capacitor dielectric layer 16.

Any metal or metal-oxide may be used for the ground electrode 20. In embodiments, the metal or metal-oxide ground electrode 20 comprises an indium tin oxide coated glass substrate. Further exemplary ground electrodes include copper electrodes, gold electrodes, and aluminum electrodes.

Similarly, any metal or metal-oxide may be used for the top electrode 12. In embodiments, the metal or metal-oxide top electrode 12 comprises aluminum. Further exemplary top electrodes include copper electrodes, gold electrodes, and aluminum electrodes.

In embodiments, the capacitor dielectric layer 16 is comprised of deoxyribonucleic acid-hexadecyltrimethyl ammonium chloride (DNA-CTMA) and sol-gel.

In embodiments, the capacitor dielectric layer 16 is comprised of deoxyribonucleic acid-hexadecyltrimethyl ammonium chloride (DNA-CTMA) and sol-gel. One process to form DNA-CTMA and sol-gel films is as follows. Sol-gel precursors consisting of Zirconium n-propoxide 70 wt % in n-propanol and a crosslinkable organosilicon alkoxide monomer, methacryloxypropyl-trimethoxysilane (MAPTMS) are aquireded. Zirconium n-propoxide complexed with methacrylic acid is then mixed with MAPTMS in the presence of 0.1 N HCl to provide the sol-gel formulation. Then DNA-CTMA is solubilized in n-butanol. The resulting viscous 6 wt % solution is then blended with the Zr/Si sol-gel solution. After vigorous stirring, the DNA-CTMA/sol-gel ceramic solution is filtered through a 1.0 μm syringe filter and spin coated on appropriate substrates for film fabrication. Spin parameters may be adjusted to control film thickness. The resulting CTMA/sol-gel films are then cured overnight under nitrogen at 130° C. to result in DNA-CTMA/sol-gel which is thermally crosslinked.

DNA-CTMA is obtained by dissolving DNA in deionized (Di) water at a concentration of 4 mg/ml. For example, 2 g of DNA may be dissolved into 500 ml DiH$_2$O. This solution is then stirred for approximately 6 hours until dissolved. As the DNA becomes more viscous, the stirring rate is increased. The DNA is then mixed with a surfactant hexecyltrimethyl ammonium chloride (CTMA). 500 ml Di H$_2$O is added to 1.95 g of CTMA. CTMA is very water soluble. It is stirred for only 5-10 minutes, then put in a refrigerator overnight. The corresponding DNA-CTMA complex is synthesized from known procedures by mixing the aqueous solutions of both DNA and CTMA to provide a water-insoluble complex which could be solubilized in n-butanol. For insulation materials, high molecular weight DNA, as received at 600-800 MDa, is most advantageous. Higher molecular weight provides higher resistivity, lower conductivity, and better insulation. The DNA-CTMA mixture is left overnight or for at least 6 hours, to spin/blend. The DNA-CTMA then goes through a soxhlet rinse to remove the excess CTMA from the solution. This takes about 6 hours. The DNA-CTMA is then vacuum oven dried in a Teflon beaker for 1-2 days. When the DNA-CTMA is completely dried, it is stored in a nitrogen glove box until it is ready to use.

In further embodiments, the dielectric layer 16 is polymer based and is comprised of polystyrene or biaxially oriented polypropylene (BOPP), for example. In various embodiments, the capacitor dielectric layer has a thickness of approximately 2 to approximately 3 microns. Further, non-limiting examples of the thickness of the capacitor dielectric layer include approximately 1 to approximately 5 microns, approximately 2 to approximately 5 microns, approximately 2 to approximately 4 microns, and approximately 3 to approximately 5 microns.

The hole blocking layer 18 increases the effective barrier height at the interface of the ground electrode 20 and the capacitor dielectric layer 16. The increased effective barrier height reduces charge accumulation and thus delays tunneling current effects. The hole blocking layer 18 also increases the electric field breakdown because of the higher energy HOMO (highest occupied molecular orbital). Additionally, the electric field breakdown is increased by separating the ground electrode 20 from the capacitor dielectric layer 16, reducing any current path that may be present in the capacitor dielectric layer 16, and reducing the impact of non-uniform electrodes with the introduction of the hole blocking layer 18. Further, the hole blocking layer 18 increases the energy density of the capacitor dielectric layer 16.

The electron blocking layer 14, similarly to the hole blocking layer 18, increases the effective barrier height at the interface of the top electrode 12 and the capacitor dielectric layer 16. The increased effective barrier height reduces charge accumulation and thus delays tunneling current effects. The electron blocking layer 14 also increases the electric field breakdown because of the lower energy LUMO (lowest unoccupied molecular orbital). Additionally, the electric field breakdown is increased by separating the top electrode 12 from the capacitor dielectric layer 16, reducing any current path that may be present in the capacitor dielectric layer 16, and reducing the impact of non-uniform electrodes with the introduction of the electron blocking layer 14. Further, the electron blocking layer 14 increases the energy density of the capacitor dielectric layer 16.

While not wishing to be bound by theory, it is believed that the hole blocking layer 18 and electron blocking layer 14 simultaneously contribute to an increase in energy barrier between the top electrode 12, the ground electrode 20 and the conduction (LUMO) and valence (HOMO) bands. As a consequence, a reduction and/or delay of the charge tunneling effects produced by the high electric fields applied to charge the capacitor dielectric layer 16 can be achieved.

Applying a positive bias voltage to the electron blocking layer 14 side of the capacitor raises the work function of the top electrode 12. This reduces the energy gap (EG) between the top electrode 12 and the LUMO level of the capacitor dielectric 16, thus reducing the barrier height. The higher the applied voltage, the smaller the energy gap, which in-turn increases the flow of electrons over the barrier height or LUMO level of the capacitor dielectric 16. The insertion of the electron blocking layer 14 between the top electrode 12 and the capacitor dielectric 14 with a higher LUMO level than the capacitor dielectric 14 increases the effective energy gap between the top electrode 12 and the new effective LUMO level of the capacitor dielectric 12. This prevents electrons from being injected into the capacitor dielectric 12 until much higher electric fields are reached. Conversely, on the hole blocking layer 18 side of the capacitor, the applied positive bias voltage on the electron blocking layer 14 side of the capacitor also increases "negatively" the work function of the ground electrode 20. This reduces the energy gap between the ground electrode 20 and the HOMO level of the capacitor dielectric 16, thus reducing the barrier height. The higher the applied voltage, the smaller the energy gap, which increases the flow of holes over the barrier height or HOMO level of the capacitor dielectric 16. The insertion of a hole blocking layer 18, between the ground electrode 20 and the capacitor dielectric 16 with a higher HOMO level than the capacitor dielectric 16 increases the effective energy gap between the ground electrode 20 and the new effective HOMO level of the capacitor dielectric 16. This prevents holes from being injected into the capacitor dielectric 16 until much higher electric fields are reached.

Figure 2:
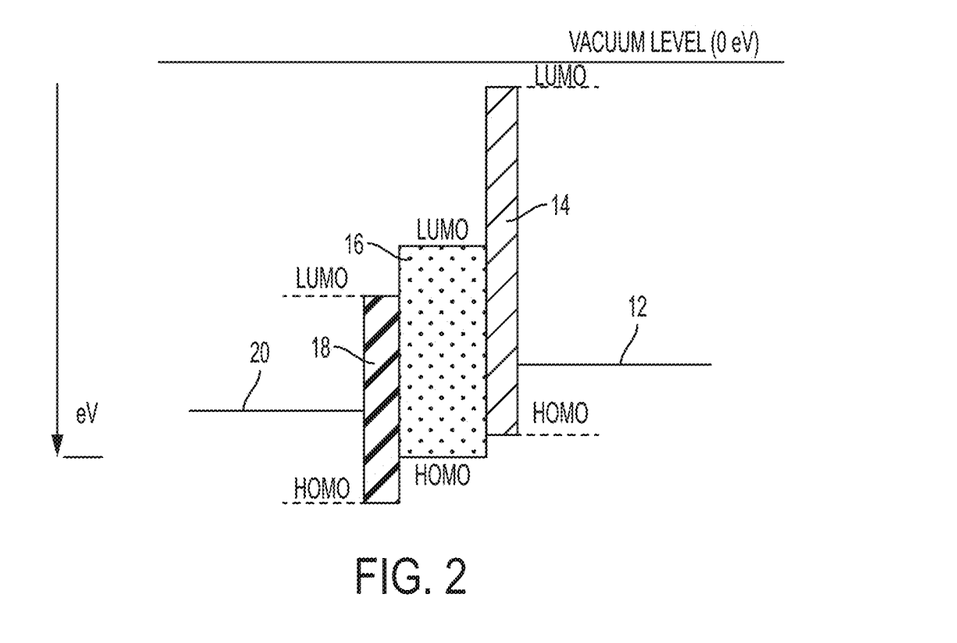
FIG. 2 is a suggested energy band diagram of the multilayer capacitor device.

On the top electrode 12 side of the capacitor, the barrier height or LUMO level of the electron blocking layer 14 is higher, or closer to the vacuum level, than the barrier height or LUMO level of the capacitor dielectric 16. On the ground electrode 20 or hole injection side of the capacitor, the barrier height or HOMO level of the hole blocking layer 18 is higher, or further from the vacuum level, than the barrier height or HOMO level of the capacitor dielectric 16. In this way, the total energy gap of the charge blocking layers (LUMO of the electron blocking layer 14 minus HOMO of the hole blocking layer 18) is greater than the energy gap of the capacitor dielectric 16. Hence, the barrier heights of the charge blocking layers (LUMO of the electron blocking layer 14 and HOMO of the hole blocking layer 18) are higher than those of the capacitor dielectric 16. This is illustrated in the energy band diagram of FIG. 2.

The hole blocking layer 18 and the electron blocking layer 14 may be deposited by various processes that are compatible with integrated circuit (IC) fabrication technologies to allow for embedded electronics. Preferred processes include physical vapor deposition (PVD), chemical vapor deposition (CVD), and solution processing such as direct write or ink-jet printing.

Any organic polymer or biopolymer can be used as the electron blocking layer 14 as long as the LUMO levels of the selected electron blocking layer 14 are lower than the capacitor dielectric layer 16 LUMO. In embodiments, the electron blocking layer 14 comprises a nucleobase. A preferred nucleobase is guanine. Guanine is preferred for formation of the electron blocking layer 14 as it exhibits chemical stability and temperature stability at temperatures greater than 400° C. Guarine also has a low LUMO of between about 1.8 and 0.3 eV, which makes it particularly suitable for use as an electron blocking layer 14. Guanine is also compatible with the DNA-CTMA and sol-gel blend of the preferred capacitor dielectric layer 16, is solvent free, and can be deposited as a very thin layer. In embodiments, the electron blocking layer 14, such as guanine, is deposited in layers of 60 nm thickness by physical vapor deposition. In further embodiments the electron blocking layer 14 is provided at various thicknesses under 100 nm, including, but not limited to, 90 nm, 80 nm, 70 nm, 50 nm, 40 nm, 30 nm, 20 nm, 10 nm, and all the ranges provided by the exemplary thicknesses.

Any organic polymer or biopolymer can be used for the hole blocking layer 18 as long as the HOMO levels of the selected hole blocking layer 18 are higher than the capacitor dielectric layer 16 HOMO. In embodiments, the hole blocking layer 18 comprises, but is not limited to, bathocuproine (BCP). BCP is a preferred material for the hole blocking layer 16 based on its high temperature and chemical stability and high HOMO level. BCP has a HOMO of about 6.7 to 7 eV. A further, non-limiting exemplary hole blocking layer 18 is a titanium oxide ($TiO_2$) film. In embodiments, the hole blocking layer 18, such as BCP, is deposited in layers of about 60 nm thickness by physical vapor deposition. In further embodiments the hole blocking layer 18 is provided at various thicknesses under 100 nm, including, but not limited to, 90 nm, 80 nm, 70 nm, 50 nm, 40 nm, 30 nm, 20 nm, 10 nm, and all the ranges provided by the exemplary thicknesses. The hole blocking layer 18 is chosen to be thick enough to delay tunneling, yet thin enough to not affect the overall dimension of the multi-layered capacitor device 10.

Because the barrier layers formed by the electron blocking layer 14 and the hole blocking layer 18 are thin, about 60 nm thick in preferred embodiments, they do not affect the overall cost, weight, or the environmental footprint of the multi-layered capacitor device 10.

In the various embodiments, the top electrode 12 should have a high work function. A high work function of the top electrode 12 allows for a high energy barrier in the electron blocking layer 14 at the interface of the capacitor dielectric layer 16 and the top electrode 12. The electron blocking layer 14 opposes electron injection into the LUMO of the capacitor dielectric layer 16. On the other side of the capacitor dielectric layer 16, a higher energy barrier in the hole blocking layer 18 is provided to oppose hole injection into the LUMO of the capacitor dielectric layer 16. The placement of the hole blocking layer 18 requires a ground electrode 20 with lower work function.

The capacitor device 10 may be used in a variety of applications. In an embodiment, the capacitor device 10 may be utilized in a mobile device. In further embodiments, the capacitor device 10 may also be used in nonlinear optic (NLO) polymer-based electro-optic (EO) modulators. For example, the hole blocking layer 18 may be deposited between the ground electrode 20 and the bottom cladding, and the electron blocking layer 14 may be deposited between the positive voltage top electrode 12 and the top cladding for poling the NLO polymer in the device configuration. Alternatively, the hole blocking layer 18 may be deposited between the ground electrode 20 and the NLO polymer and the electron blocking layer 14 deposited between the positive voltage top electrode 12 and the NLO polymer in the poling only configuration. Such configurations increase the electric field that may be applied for poling the NLO polymer and will, in turn, increase the alignment of the chromophores and the nonlinearity of the NLO polymer. This will also reduce the applied voltage needed to induce a π (pi) phase change in the NLO polymer EO modulator and reduce the operational voltage of the device.

In order that the invention may be more readily understood, reference is made to the following example, which is intended to illustrate the invention, but is not to be taken as limiting the scope thereof.

Example 1

A multi-layered capacitor device 10 was formed in accordance with an embodiment of the invention. A metal-insulator-metal (MIM) test structure was used for the multilayered capacitor device 10. A 60 nm thick layer of BCP as the hole blocking layer 18 was deposited by physical vapor deposition onto an indium tin oxide (ITO) coated glass substrate electrode (ground electrode 20). The hole blocking layer 18 was chosen to be thick enough to delay tunneling, yet thin enough to not affect the overall dimension of the device. In some test structures a DNA-CTMA/sol-gel layer having a thickness of 2-3 microns was spin-deposited onto the thin film of BCP to form the capacitor dielectric layer 16. In further test structures a polystyrene layer having a thickness of 2-3 microns was spin-deposited onto the thin film of BCP to form the capacitor dielectric layer 16. A 60 nm thick layer of guanine as the electron blocking layer 14 was vapor deposited on top of the DNA-CTMA/sol-gel or polystyrene using physical vapor deposition. A solvent insoluble material was chosen for the electron blocking layer 14 to avoid any electron blocking layer 14 compromise since DNA-CTMA/sol-gel and polystyrene are prepared with organic solvents. Finally, aluminum electrodes having a thickness of 100 nm were deposited through a shadow mask by thermal evaporation to form the top electrode 12.

Figure 3A:
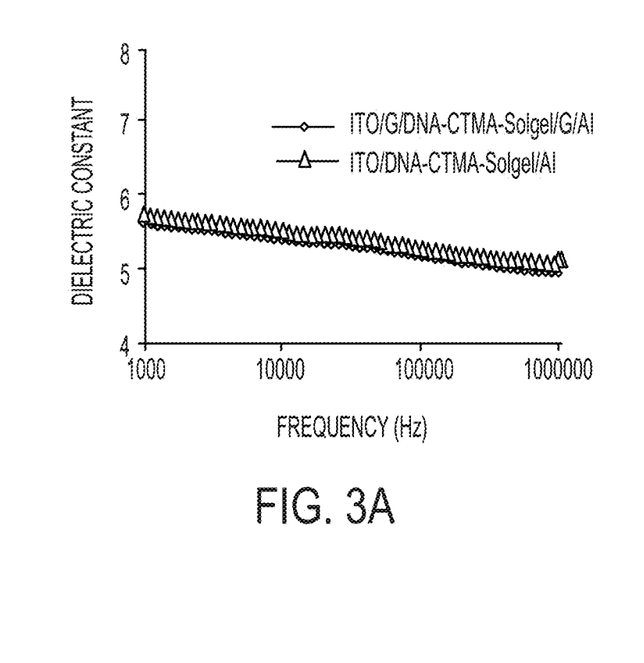
FIGS. 3a and b are graphs illustrating the dielectric properties of the multilayer device.
Figure 3B:
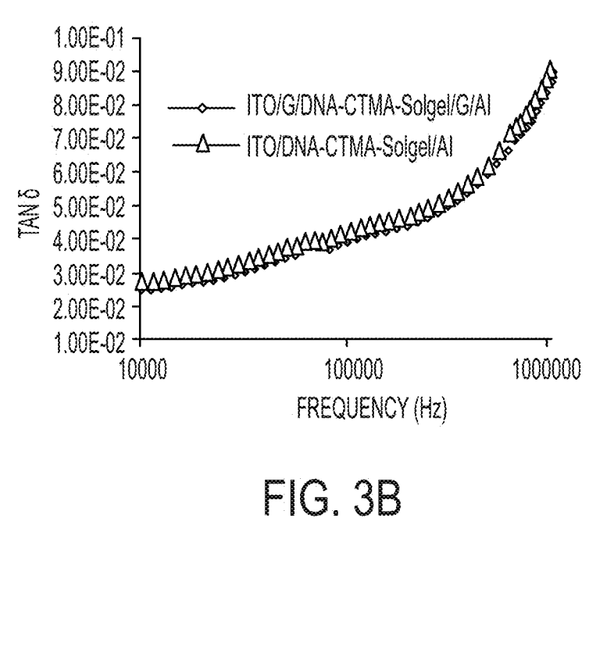

Dielectric characterization was conducted on the multi-layered capacitor device 10. The results are shown in FIGS. 3A and 3B. As can be seen, dielectric constant and dielectric loss for a guanine (G) layered device having an ITO/G/DNA-CTMA sol-gel/G/Al arrangement is similar to a single layer ITO/DNA-CTMA-solgel/Al hybrid without the electron blocking layer 14 and hole blocking layer 18. Specifically, a dielectric constant of about 5.5 to 5 is maintained over a frequency range of 1 kHz to 1 MHz for both the BCP/DNA-CTMA-sol-gel/guanine arrangement and the single layered DNA-CTMA/sol-gel hybrid arrangement.

Figure 4:
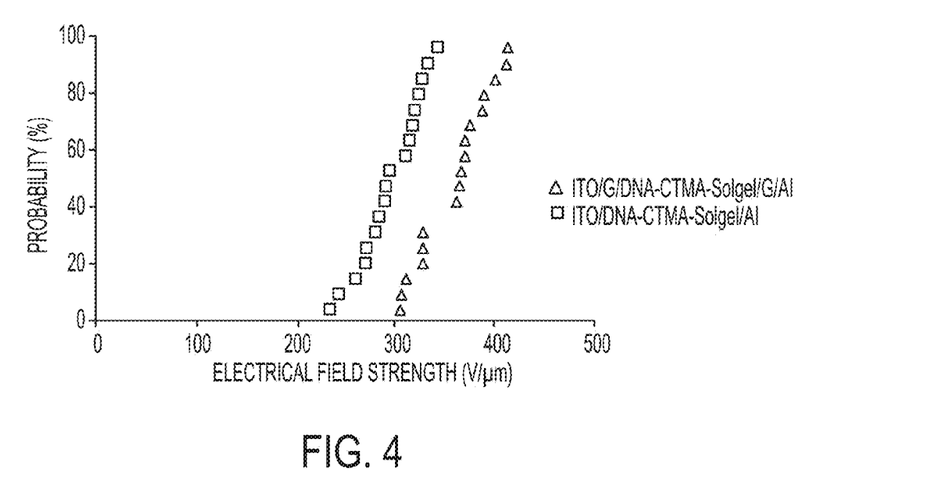
FIGS. 4 and 5 are graphs illustrating Weibull plots for the multilayered devices.
Figure 5:
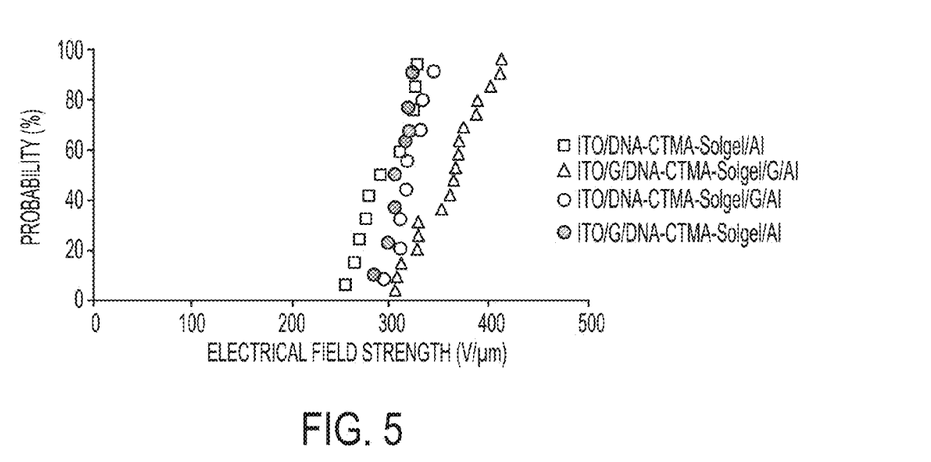

Voltage breakdown measurements were obtained for several configurations of layered devices. Initial results of the ITO/G/DNA-CTMA sol-gel/G/Al device showed improved electric field strengths of >50 V/μm for the guanine layered devices as compared with single-layered ITO/DNA-CTMA-Solgel/Al configuration. This comparison is shown in the Weibull plots of FIG. 4. Several configurations of the guanine layers were tested, and the effect of layer position of guanine on breakdown strength is illustrated in FIG. 5. As can be seen, guanine deposited on both sides of the DNA layer (ITO/G/DNA-CTMA-Solgel/G/Al) exhibited the greatest enhancement in electric field strength (over 50 V/μm). Guanine deposited on the Al electrode side only (ITO/DNA-CTMA-Solgel/guanine/Al) exhibited a small increase of the dielectric strength and guanine on the ITO side only (ITO/G/DNA-CTMA-Solgel/Al) showed minimal enhancement as compared to a single layer ITO/DNA-CTMA-Solgel/Al configuration.

Figure 6:
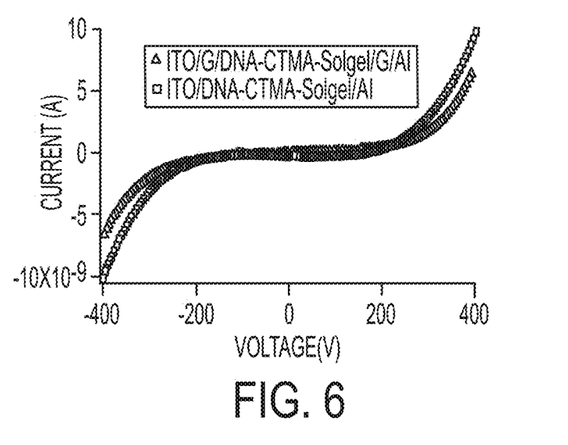
FIG. 6 is a graph illustrating leakage current for the multilayered device.

Leakage current measurements of a layered guanine device having the arrangement of ITO/G/DNA-CTMA-Solgel/G/Al in comparison with a ITO/DNA-CTMA-Sogel/Al single layer device are shown in FIG. 6. The layered device shows improvement in leakage current.

Figure 7:
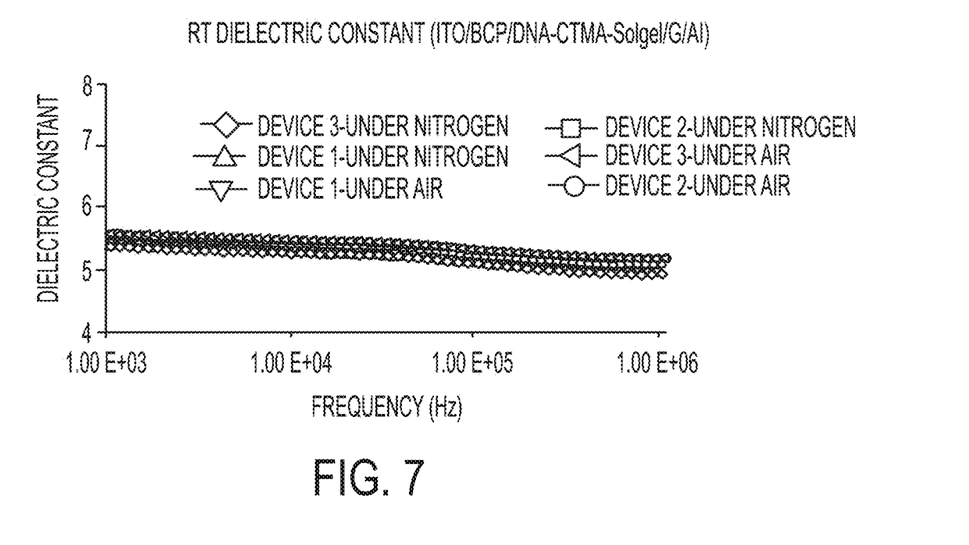
FIG. 7 is a graph illustrating the dielectric constant of the multilayered device.

Dielectric characterization was also conducted on the layered films incorporating BCP as the hole blocking layer 18 and guanine as the electron blocking layer 14, showing similar results as obtained from previous devices. Specifically, a dielectric constant of about 5.5 at 1 kHz is obtained for the multi-layered capacitor device 10. The characterization was run on three devices with the same configuration of ITO/BCP/DNA-CTMA-Solgel/G/Al. Results for the dielectric characterization of the ITO/BCP/DNA-CTMA-Solgel/G/Al arrangement are shown in FIG. 7.

Figure 8:
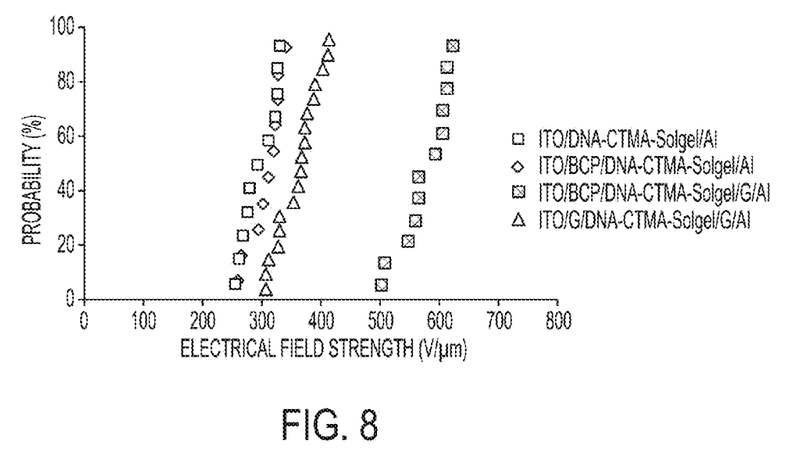
FIGS. 8-10 are graphs illustrating Weibull plots for the multilayered devices.

Breakdown measurements were performed on the ITO/BCP/DNA-CTMA-Solgel/G/Al devices. Results show a significant improvement in electrical field strength, with values greater than 600 V/μm. This is over a 200 V/μm improvement compared to ITO/DNA-CTMA-Solgel/Al only devices without the electron blocking layer 14 and the hole blocking layer 18. FIG. 8 shows the results of the ITO/BCP/DNA-CTMA-Solgel/G/Al films as well as comparisons with ITO/

DNA-CTMA-Solgel/Al only devices and other layered configurations. The breakdown measurements for the ITO/BCP/DNA-CTMA-Solgel/G/Al devices are close to that of Biaxially-Oriented Polypropylene (BOPP) films at greater than 600 V/μm.

Figure 9:
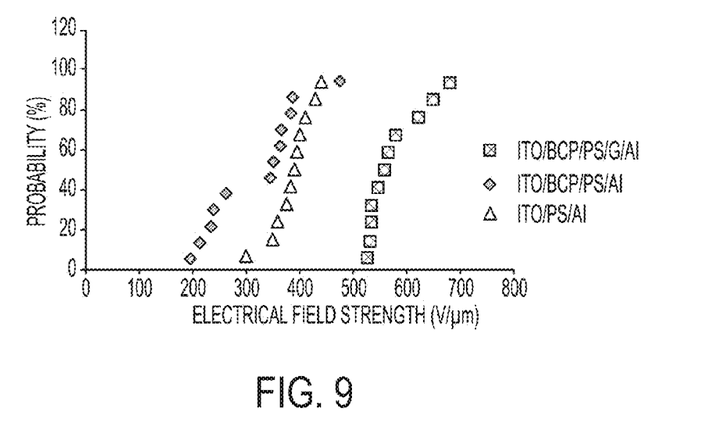

The BCP/guanine layered structure was recreated with polystyrene (PS) as the material of the capacitor dielectric layer 16. The resulting ITO/BCP/PS/G/Al device was tested to confirm the action of the BCP hole blocking layer 18 and the guanine electron blocking layer 14 for another common dielectric material. This device also showed a significant increase in electric field strength and results of the breakdown measurements are shown in the Weibull plots of FIG. 9. FIG. 9 shows ITO/BCP/PS/G/Al films compared to polystyrene as a single layer, confirming a significant increase in dielectric breakdown strength for the hole blocking layer 18, capacitor dielectric layer 16, and electron blocking layer 14 layered configuration. This is a greater than 150 V/μm improvement over polystyrene devices.

Figure 10:
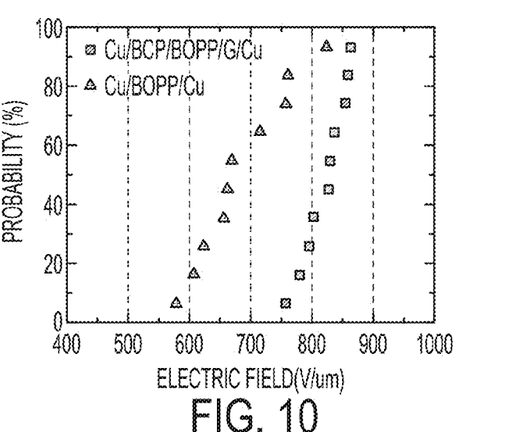

The BCP/guanine layered structure was recreated with Biaxially-Oriented Polypropylene (BOPP) as the material of the capacitor dielectric layer 16. The resulting Cu/BCP/BOPP/G/Cu device was tested to confirm the action of the BCP hole blocking layer 18 and the guanine electron blocking layer 14 for an additional dielectric material. This device also showed a significant increase in electric field strength and results of the breakdown measurements are shown in the Weibull plots of FIG. 10. FIG. 10 shows BCP/BOPP/guanine films compared to BOPP as a single layer, confirming a significant increase in dielectric breakdown strength for the hole blocking layer 18, capacitor dielectric layer 16, and electron blocking layer 14 layered configuration. This is a greater than 150 V/μm improvement over BOPP devices.

Figure 11:
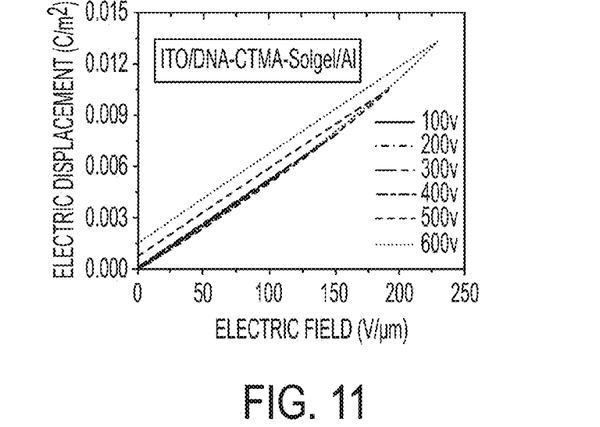
FIGS. 11-13 are graphs illustrating electric displacement for the layered devices.
Figure 12:
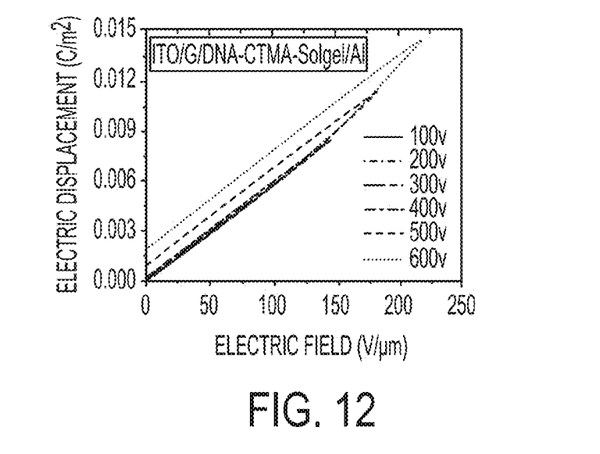
Figure 13:
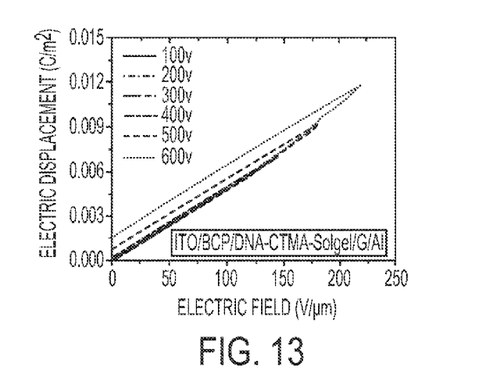

Polarization measurements were taken on the layered devices and Hysteresis loops were run for DNA-CTMA-sol-gel, guanine/DNA-CTMA-sol-gel/guanine, and the BCP/DNA-CTMA-sol-gel/guanine layered devices as shown in FIGS. 11-13. FIGS. 11-13 show that the charge-discharge efficiency of the capacitor doesn't degrade with the introduction of the hole blocking layer 18 and electron blocking layer 14 into the capacitor structure.

Figure 14A:
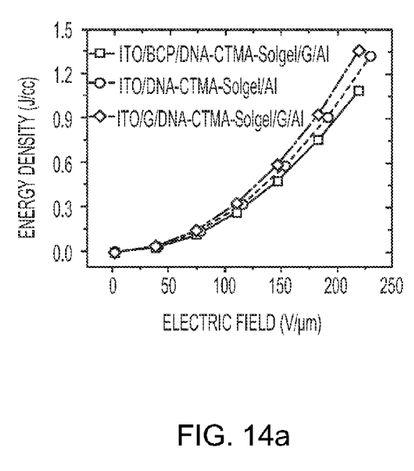
FIGS. 14a and b illustrate the energy density for single and multilayered devices.
Figure 14B:
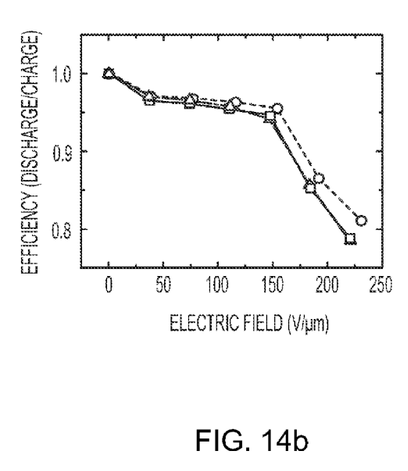

Referring to FIGS. 14A and 14B which show results for energy density and efficiency of ITO/DNA-CTMA/Solgel/Al, and layered devices with ITO/G/DNA-CTMA-Solgel/G, and ITO/BCP/DNA-CTMA-Solgel/G/Al. Results showed similar behavior in energy storage potential and efficiency for all three devices. Measured energy density was close to calculated values. Efficiency for all devices began to degrade at higher fields.

Figure 15:
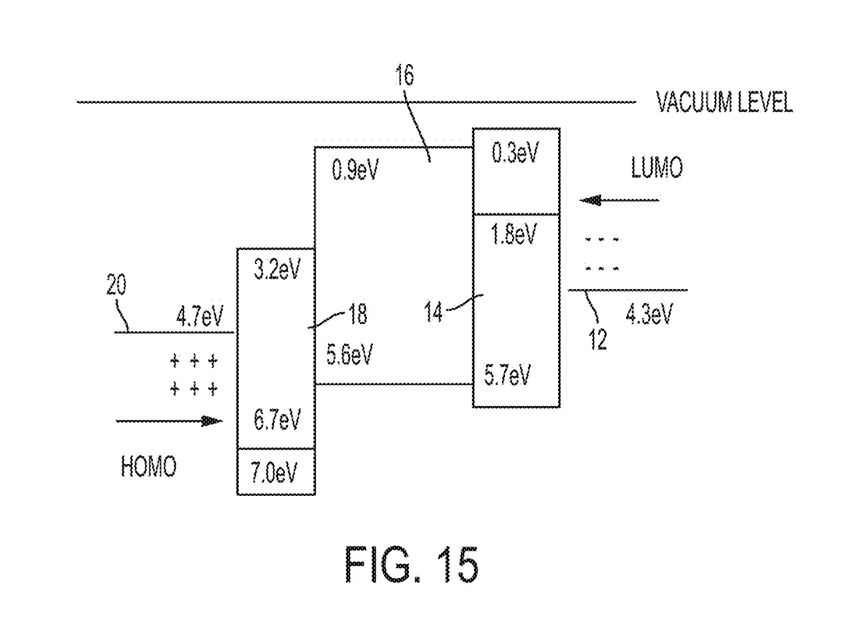
FIG. 15 illustrates the suggested electron/hole transport mechanism in the layered device.

The layered films may minimize charge carriers motion and charge buildup at the interface and block movement of the charge from one layer to the next as illustrated in FIG. 15.

Having described the invention in detail and by reference to preferred embodiments thereof, it should be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

Unless otherwise defined, all technical and scientific terms used herein have the same meaning as commonly understood by one of ordinary skill in the art to which the claimed subject matter belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

It is noted that terms like "preferably," "commonly," and "typically" are not utilized herein to limit the scope of the appended claims or to imply that certain features are critical, essential, or even important to the structure or function of the claimed subject matter. Rather, these terms are merely intended to highlight alternative or additional features that may or may not be utilized in a particular embodiment.

Throughout this disclosure exemplary ranges are provided. One having skill in the art would recognize, and Applicants intend, that all other ranges falling within the extremes of the examples are equally envisioned. For example, provided exemplary ranges of 1-5, 2-3, and 2-5 also include 1-3 and 3-5.

What is claimed is:

1. A multi-layered capacitor device, the multi-layered capacitor device comprising:
   a metal or metal-oxide ground electrode;
   a capacitor dielectric layer;
   a metal or metal-oxide top electrode;
   a hole blocking layer disposed at the interface of the metal or metal-oxide ground electrode and the capacitor dielectric layer; and
   an electron blocking layer disposed at the interface of the metal or metal-oxide top electrode and the capacitor dielectric layer, wherein the lowest unoccupied molecular orbital level of the electron blocking layer is lower than the lowest unoccupied molecular orbital level of the capacitor dielectric layer.

2. The multi-layered capacitor device of claim 1, wherein the capacitor dielectric layer is polymer-based, the hole blocking layer is polymer-based, and the electron blocking layer is polymer-based.

3. The multi-layered capacitor device of claim 1, wherein the electron blocking layer increases the effective barrier height at the interface of the capacitor dielectric layer and the metal-oxide top electrode and the hole blocking layer increases the effective barrier height at the interface of the metal or metal-oxide ground electrode and the capacitor dielectric layer.

4. The multi-layered capacitor device of claim 1, wherein the electron blocking layer comprises an organic polymer or biopolymer.

5. The multi-layered capacitor device of claim 1, wherein the electron blocking layer comprises guanine.

6. The multi-layered capacitor device of claim 1, wherein the electron blocking layer is less than 100 nm in thickness.

7. The multi-layered capacitor device of claim 1, wherein the electron blocking layer has a lowest unoccupied molecular orbital level between about 1.8 and 0.3 eV.

8. The multi-layered capacitor device of claim 1, wherein the electron blocking layer has a lower electrical resistivity than the capacitor dielectric layer.

9. The multi-layered capacitor device of claim 1, wherein the highest occupied molecular orbital level of the hole blocking layer is higher than the highest occupied molecular orbital level of the capacitor dielectric layer.

10. The multi-layered capacitor device of claim 1, wherein the hole blocking layer comprises an organic polymer or biopolymer.

11. The multi-layered capacitor device of claim 10, wherein the hole blocking layer comprises bathocuproine.

12. The multi-layered capacitor device of claim 1, wherein the hole blocking layer is less than 100 nm in thickness.

13. The multi-layered capacitor device of claim 1, wherein the hole blocking layer has a highest occupied molecular orbital level between about 6.7 and 7.0 eV.

14. The multi-layered capacitor device of claim 1, wherein the hole blocking layer has a lower electrical resistivity than the capacitor dielectric layer.

15. The multi-layered capacitor device of claim 1, wherein the capacitor dielectric layer comprises polystyrene or biaxially-oriented polypropylene.

16. A multi-layered capacitor device, the multi-layered capacitor device comprising:
    a metal or metal-oxide ground electrode;
    a capacitor dielectric layer;
    a metal or metal-oxide top electrode;
    a hole blocking layer disposed at the interface of the metal or metal-oxide ground electrode and the capacitor dielectric layer, wherein the capacitor dielectric comprises deoxyribonucleic acid-hexadecyltrimethyl ammonium chloride and sol-gel; and
    an electron blocking layer disposed at the interface of the metal or metal-oxide top electrode and the capacitor dielectric layer.

17. The multi-layered capacitor device of claim 16, wherein the electron blocking layer has a lowest unoccupied molecular orbital level between about 1.8 and 0.3 eV and the hole blocking layer has a highest occupied molecular orbital level between about 6.7 and 7.0 eV.

18. The multi-layered capacitor device of claim 16, wherein the electron blocking layer is 50 to 70 nm in thickness and the hole blocking layer is 50 to 70 nm in thickness.

19. A multi-layered capacitor device, the multi-layered capacitor device comprising:
    a metal or metal-oxide ground electrode comprising indium tin oxide coated glass;
    a polymer-based capacitor dielectric layer comprising deoxyribonucleic acid-hexadecyltrimethyl ammonium chloride and sol-gel;
    a metal or metal-oxide top electrode comprising aluminum;
    a polymer-based hole blocking layer comprising bathocuproine disposed at the interface of the metal or metal-oxide ground electrode and the polymer-based capacitor dielectric layer, wherein the hole blocking layer is less than 100 nm in thickness and the highest occupied molecular orbital level of the hole blocking layer is higher than the highest occupied molecular orbital level of the capacitor dielectric layer; and
    a polymer-based electron blocking layer comprising guanine disposed at the interface of or metal-oxide top electrode and the polymer-based capacitor dielectric layer, wherein the electron blocking layer is less than 100 nm in thickness and the lowest unoccupied molecular orbital level of the electron blocking layer is lower than the lowest unoccupied molecular orbital level of the capacitor dielectric layer.

* * * * *